Oct. 31, 1967     G. OBERLANDER     3,350,038
AIRCRAFT CATAPULT SYSTEM
Filed Aug. 6, 1965     4 Sheets-Sheet 1

INVENTOR.
Georg Oberländer
BY

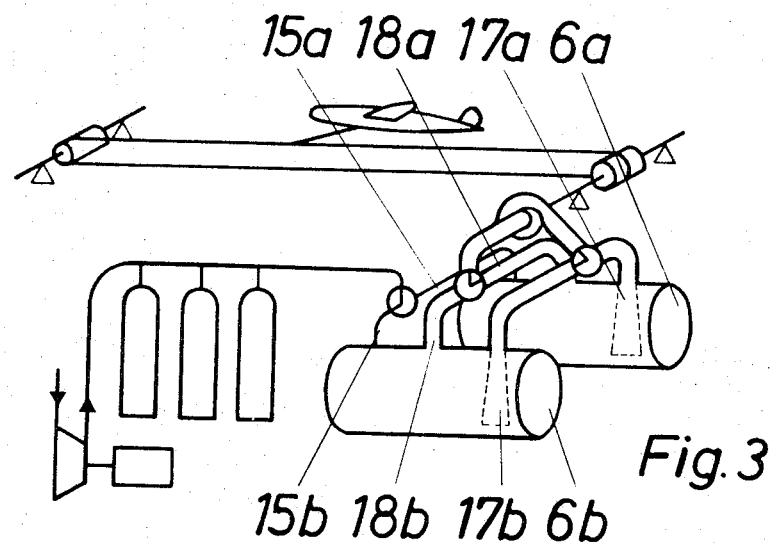
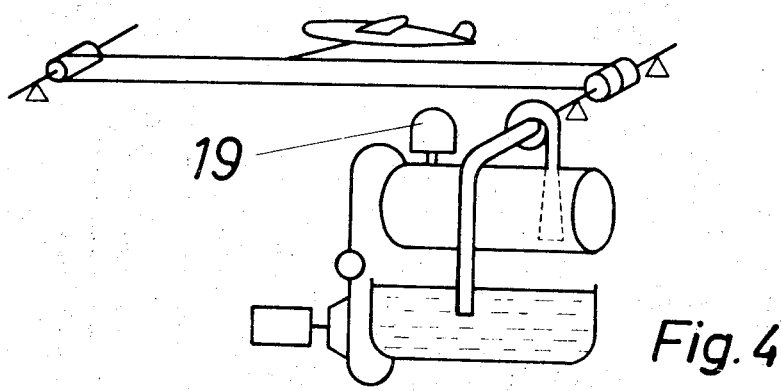

Oct. 31, 1967  G. OBERLANDER  3,350,038
AIRCRAFT CATAPULT SYSTEM
Filed Aug. 6, 1965
4 Sheets-Sheet 4

INVENTOR.
Georg Oberländer
BY

United States Patent Office 3,350,038
Patented Oct. 31, 1967

3,350,038
AIRCRAFT CATAPULT SYSTEM
Georg Oberlander, 22 Parkstrasse,
506 Bensberg, Germany
Filed Aug. 6, 1965, Ser. No. 477,911
Claims priority, application Germany, Aug. 8, 1964,
K 53,703
9 Claims. (Cl. 244—63)

The present invention relates to a catapult for aircraft, which comprises a launch cable passed over sheaves by means of which cable an aircraft can be accelerated when driving one of the sheaves. Catapults of the above mentioned type are employed where prevailing fixed runways for certain aircraft types are too short or where any fixed runways are missing altogether. The acceleration to which the aircraft are subjected by a catapult or launching arrangement is so high that on one hand short launching strokes are obtained while on the other hand considerable driving power is required.

With a heretofore known installation of the type involved, the launch cable is driven through the intervention of a capstan which is adapted to be drivingly connected with the working turbine of a gas turbine through the intervention of a transmission. Up to the launching start, such driven capstan is held fast by means of a brake while in the meantime the gas producer of the driving turbine is accelerated to full speed. When disengaging the capstan brake, there will thus be available the total energy of the working gases for actuating the working turbine which in its turn will then accelerate the capstan to the desired extent. This heretofore known installation, however, has the drawback that no energy storage is possible during the launching intermissions, which means that the gas turbine has to be designed for the maximum power output for the launching operation which takes only a few seconds. Furthermore, a stepdown transmission is required for the maximum power output because the speed of the driven capstan is considerably lower than the speed required for gas turbines.

With another heretofore known launching installation, the energy required for the acceleration of the capstan is first stored in a flywheel and at the launching start is released to the driven capstan through the intervention of a disengageable clutch. Inasmuch as the required energy is extremely high, the flywheel requires considerable dimensions. In addition thereto, the clutch between flywheel and capstan is exposed to extremely high shock-like stresses and has to be dimensioned accordingly. Moreover, there exists the necessity of providing a transmission between capstan and flywheel because a flywheel which would rotate at the relatively low speed of the capstan would require dimensions which are absolutely inadmissible.

It is, therefore an object of the present invention to provide an aircraft launching installation or catapult which will overcome the above mentioned drawbacks.

It is another object of this invention to provide a catapult with energy storage during the launching interval, which does not require a stepdown transmission.

It is also an object of the invention to provide an aircraft launching installation as set forth in the preceding paragraphs, in which the energy storage means have to be designed only for the energy required for one single launching operation.

Still another object of this invention consists in the provision of a launching installation of the above mentioned type, which has a considerably reduced weight over heretofore known launching arrangements whereby the launching installation can be more easily transported.

These and other objects and advantages of the invention will appear more clearly from the following specification in connection with the accompanying drawings, in which:

FIG. 3 shows a catapult system similar to that of FIG. 1, but differing therefrom in that two pressure reservoirs are provided.

FIG. 4 shows a catapult system similar to that of FIG. 1, but differing therefrom in that the pressure in the pressure reservoir is produced by burning a rocket propellant.

Figure 7:
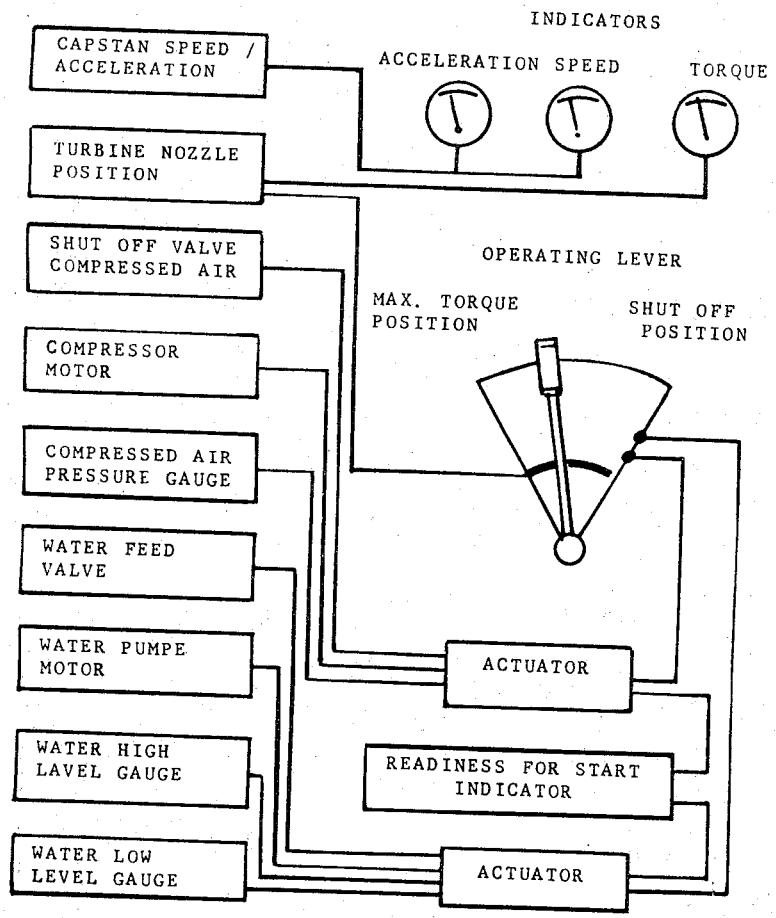

FIG. 7 diagrammatically illustrates a control system for controlling a catapult system according to the present invention.

*General arrangement*

The launching installation or catapult according to the present invention is characterized primarily in that the driving sheave of the catapult is adapted to be coupled to a hydraulic turbine, such as a water turbine, which is fed by a reservoir the contents of which are under the pressure of a gaseous medium. The catapult according to the present invention is fundamentally a launching arrangement with energy storage during the launching intervals.

*Structural arrangement*

Referring more specifically to the drawings, the aircraft launching arrangement or catapult illustrated therein comprises primarily an endless launch cable 3 which is passed over two sheaves 1 and 2. Launch cable 3 has such a length and during the launching operation is driven in the direction of the arrow S through the intervention of sheave 2 at such a speed that an aircraft 4 connected to the upper strand of said launch cable 3 will at the latest when reaching roller or sheave 1 have reached its launching speed. The drive of the sheave 2 is effected by a water turbine 5 which is fixedly coupled to the shaft of sheave 2. The water supply source for water turbine 5 may consist of a single storage container containing the water for actuating the turbine. Thus, for instance, an elevated container may be employed or a container the interior of which is under the pressure of compressed air and which is refilled after each launching operation. Of course, if desired, a plurality of such air pressure containers may be employed, as shown in FIG. 3, which are alternately effective and refilled and of which one only has to be filled for one launching operation. For purposes of effecting a launching operation, such container is on one hand connected with the water turbine and on the other hand with a pressure storage device of any standard type. The liquid collected behind the turbine is to the same extent per time unit as the container is pressed empty, filled into another container which is filled up and placed under pressure to be in readiness for supplying the turbine with water for the next launching operation. More specifically with references to the drawing, the water turbine 5 is supplied with water from a reservoir or feeding container 6 while the water released from the turbine during the launching operation is collected in an open collecting container 7. The supply unit for the water turbine furthermore comprises an electric motor 8 drivingly connected to a pump 9 the suction side of which communicates with collecting container 7 while the pressure side of pump 9 communicates with the reservoir 6. In addition thereto, there are provided three compressed air filled containers 10, 11 and 12 adapted to be filled by a compressor 14 adapted to be driven by an electric motor 13. The compressed air battery composed of the pressure containers 10, 11 and 12 is adapted to communicate with the feeding container 6. The conduit leading from the pressure containers 10, 11 and 12 to reservoir 6 includes a shutoff valve 16.

If the feeding container 6 does not represent an elevated container, it is advisable to arrange the said feeding container in the direct vicinity of the water turbine. The feeding line for the turbine should start in the vicinity of the bottom of said reservoir or feeding container 6 and should lead to the turbine nozzles over the shortest way possible. Furthermore, the liquid level in container 6 should be below said turbine nozzles, and a conduit 15, preferably connected above the liquid level, should communicate through a shutoff valve 16 with the pressure source. As mentioned above, the pressure source for the gaseous medium may be represented by a plurality of pressure containers 10, 11 and 12 or may consist of an arrangement in which the required pressure is produced by firing a set of rockets. It is also possible to produce the pressure by heating and vaporizing a liquid.

*Operation*

The operation of the launching arrangement according to the present invention is as follows:

Prior to each launching operation, feeding container 6 is by means of the pump unit 8, 9 filled with water. At the same time, the compressed air containers 10, 11 and 12 are by means of the compressor unit 13, 14 filled while shutoff valve 16 in conduit 15 is closed. When a launching operation is to be initiated, valve 16 is opened whereupon the water in feeding container 6 is pressed through conduit 17 of the water turbine 5 which latter then brings sheave 2 from speed zero in the time period provided for the intended length of the launching stroke to the speed required for the launching of the aircraft 4 connected to the upper strand 3 of the launch cable. When this speed has been reached at the desired point of the launch stroke, the aircraft detaches itself in a well-known manner from the launch cable and commences its climb. The discharge opening of water turbine 5 communicates through conduit 18 with the collecting container 7. Immediately after the launching operation, pump 9 refills the feeding container 6 while compressor 14 fills the compressed air containers 10, 11 and 12 after shutoff valve 16 has been closed so that by the time the next aircraft is connected to launch cable 3 the catapult will be in readiness for the next launching operation.

Figure 1:
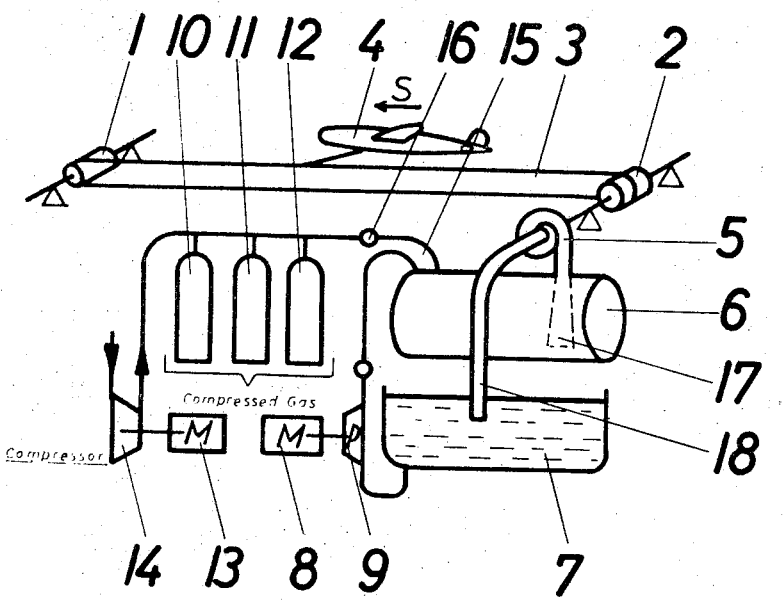
FIG. 1 shows a catapult system according to the present invention, with a driving sheave driven by hydraulic turbine fed by a reservoir, the content of which is under the pressure of a gaseous medium.
Figure 2:
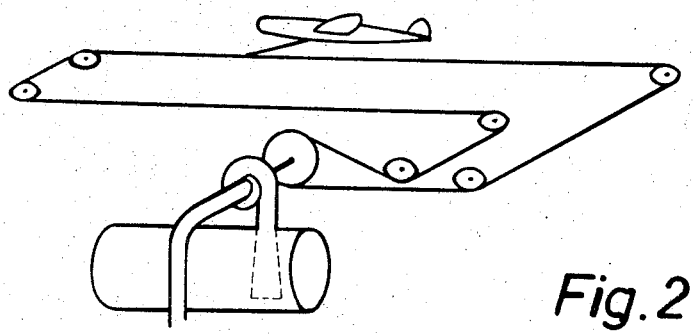
FIG. 2 illustrates a captapult system modified over that of FIG. 1 in that more than two sheaves are provided for guiding the launch cable of the catapult system.
Figure 6:
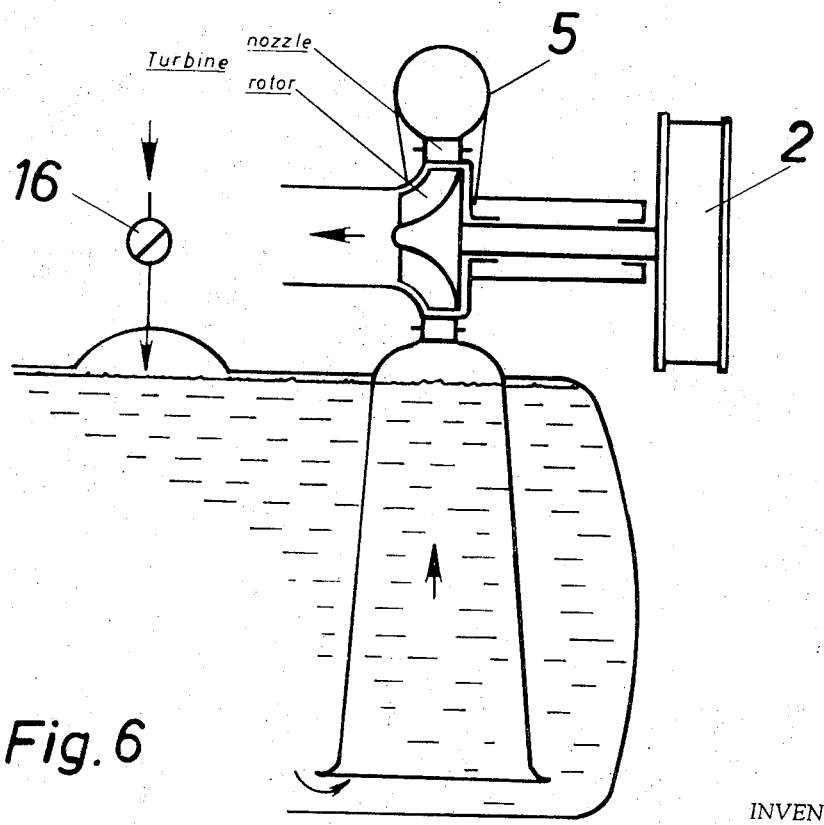
FIG. 6 illustrates the arrangement of a hydraulic turbine and a pressure reservoir for use in connection with the catapult system according to the present invention.

It is, of course, to be understood that while FIG. 1 for purposes of simplification shows the water turbine directly connected to sheave 2, actually a capstan 2 is driven by the water turbine as shown in FIG. 6, and in the manner well known in connection with heretofore known catapults, the capstan drives the launch cable passed over the sheaves.

As will be seen from the above, an aircraft launching installation or catapult according to the present invention has, over heretofore known installations of the type involved, a number of important advantages. First of all, no stepdown transmission is required, since it is possible without difficulties to design the water turbine for the speed of the capstan to be driven. Furthermore, the stationary energy storage is of advantage particularly with regard to a mobile employment of the catapult. The energy storage container need be designed for one launching operation only. The required containers can be made of light metal.

Particularly over heretofore known arrangements with flywheel energy storage, the catapult according to the present invention has the advantage that its transport is much easier because the containers can be transported in empty condition. It is also advantageous to combine the energy storage means to a single unit. With heretofore known installations of the type involved employing flywheel energy storage, the heavy flywheel has always to be transported separately.

Of particular interest in connection with the mobile employment of the catapult according to the present invention is the fact that a post-aligning at the launching site is superfluous because the water turbine may be connected directly to the shaft of the driven capstan. When with heretofore known catapults the capstan is driven by a gas turbine through a transmission or a flywheel, it is always necessary carefully to align these elements. Over an installation with flywheel energy storage, the catapult according to the present invention has the further advantage that it is better suited for a sudden energy transmission to the capstan. A flywheel will during its energy transfer lose speed, whereas the capstan has to be accelerate from the spee zero to the maximum speed. This means that during the launching operation, a friction output in the clutch is transformed into heat or that a further storage of energy has to be provided in resilient cables or resilient clutch elements. The flywheel speed drops at the same time as the launch cable has to be accelerated from zero to full speed.

Moreover, with a catapult according to the present invention, the energy storage can be effected during a launching operation, whereas with heretofore known catapults employing a flywheel, the flywheel cannot store energy during a launching operation. Thus, with a catapult according to the present invention, a longer period of time is available for storing or refilling energy which means that the units such as compressor for furnishing the compressed air to the compressed air container units can be designed smaller.

It is, of course, to be understood that the present invention is, by no means, limited to the particular arrangement shown in the drawings and referred to in the specification but also comprises any modifications within the scope of the appended claims. Thus, it may be mentioned that the device for storing energy in a catapult according to the present invention may be of any desired construction. However, at any rate, it will be advisable preferably to employ automatically effective devices for building up and maintaining the readiness of the liquid supply source for the turbine after each start. Furthermore, the pressure in the pressure reservoir may also be produced by burning a rocket propellant at 19 as shown in FIG. 4.

Figure 5:
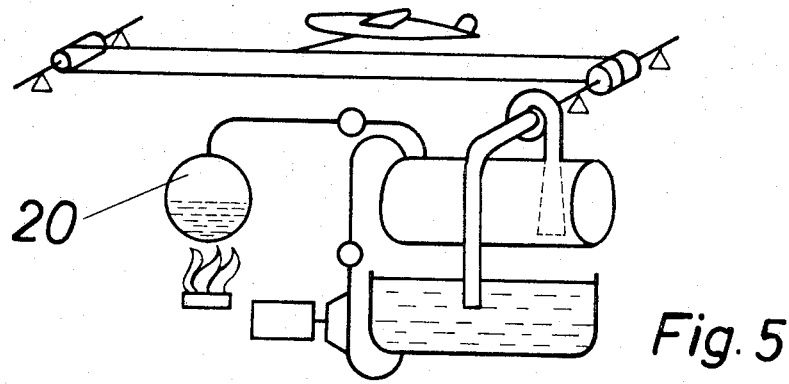
FIG. 5 shows another modification of the catapult system according to the present invention, in which the pressure in the reservoir is produced by evaporating a liquid in a pressure container.

Still according to another modification shown in FIG. 5, the pressure in the reservoir may be produced by evaporating a liquid in a pressure container 20.

FIG. 7 shows schematically a device for operating a catapult according to the present invention. On the left side are shown the connections to the different elements of the installation, on the right side the connections to the operating panel. Electric, pneumatic, hydraulic or mechanic connections may be used.

What I claim is:

1. An aircraft catapult system, which includes: a launch cable adapted to be connected to an aircraft to be catapulted, means supporting and guiding said launch cable, a liquid operable turbine having inlet means and outlet means and being drivingly connectable to said cable supporting and guiding means for accelerating said cable, liquid storage and supply means connectable to said inlet means, and means for creating a desired gas pressure in said liquid storage and supply means.

2. An aircraft catapult system according to claim 1, which includes means operatively connected to said liquid storage and supply means and operable automatically to place said liquid storage and supply means into readiness for operation following each launching operation.

3. An aircraft catapult system according to claim 1, which includes: a plurality of liquid storage and supply means respectively individually connectable to said inlet means for actuating said cable; each of said liquid storage supply means for creating a desired gas pressure in any one of said liquid storage and supply means.

4. An aircraft catapulting system according to claim 3, which includes collecting container means connected to the outlet means of said turbine for collecting the liquid discharged by said turbine, means conveying liquid from said collecting container means to one of said storage and supply means to be filled, and means for conveying gaseous pressure to the respective storage and supply means being filled.

5. An aircraft catapult system according to claim 1, which includes: conduit means leading from the bottom area of said liquid storage and supply means over as short as possible a path to said turbine inlet means for conveying actuating liquid to said turbine to actuate the latter, said inlet means being formed by nozzle means located above the maximum liquid level in said turbine, gas pressure supply means, and additional conduit means including a shut-off valve and leading from said pressure supply means to a portion of said turbine located above the maximum liquid level in said turbine, collecting container means communicating with the outlet means of said turbine, and pump means communicating with said collecting container and said liquid storage and supply means for conveying liquid from said collecting container to said storage and supply means.

6. An aircraft catapult system according to claim 1, in which said liquid storage and supply means is elevated relative to said turbine to convey liquid under the required pressure to said turbine.

7. An aircraft catapult system according to claim 1, in which said means for creating a desired gas pressure in said liquid storage means includes pressure gas containers.

8. An aircraft catapult system according to claim 7, in which said means for creating a desired gas pressure in said liquid storage means includes means for firing rocket means.

9. An aircraft catapult system according to claim 1, in which said means for creating a desired gas pressure in said liquid storage means includes means for heating and evaporating a liquid.

References Cited

UNITED STATES PATENTS

| | | | |
|---|---|---|---|
| 2,493,014 | 9/1940 | Nelson | 244—63 |
| 2,523,314 | 9/1950 | Maxson et al. | 244—63 |
| 2,737,357 | 3/1956 | Ringle | 244—63 |
| 2,783,004 | 2/1957 | Fieux | 244—63 |
| 2,843,343 | 7/1957 | Ward | 244—63 |

MILTON BUCHLER, *Primary Examiner.*

B. BELKIN, *Assistant Examiner.*